(12) United States Patent
Chen et al.

(10) Patent No.: US 11,816,278 B1
(45) Date of Patent: Nov. 14, 2023

(54) DISPLAY PANEL AND ELECTRONIC DEVICE

(71) Applicant: WUHAN CHINA STAR OPTOELECTRONICS TECHNOLOGY CO., LTD., Hubei (CN)

(72) Inventors: Shengyang Chen, Hubei (CN); Chao Tian, Hubei (CN); Fei Ai, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/050,794

(22) Filed: Oct. 28, 2022

(30) Foreign Application Priority Data

Sep. 6, 2022 (CN) .......................... 202211085023.8

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC ....... G06F 3/046; G06F 3/0412; G06F 3/0446
See application file for complete search history.

(56) References Cited

U.S. PATENT DOCUMENTS

2021/0141492 A1* 5/2021 Lee ........................ G06F 3/0446

* cited by examiner

*Primary Examiner* — Robin J Mishler
(74) *Attorney, Agent, or Firm* — PV IP PC; Wei Te Chung; Zhigang Ma

(57) ABSTRACT

A display panel and an electronic device are provided. The display panel includes a substrate, first touch coils, pad groups, light-emitting units, and connection lines. The first touch coils are disposed on the substrate. The pad groups are disposed on the substrate. The pad groups are disposed on a side of the first touch coils facing away the substrate. The light-emitting units are disposed on the corresponding pad groups. The connection lines are disposed insulated from the first touch coils. The connection lines are connected to two pad groups. The connection lines and the first touch coils are disposed in different layers. The connection lines intersect with the first touch coils. Intersection positions of the connection lines and the first touch coils form overlapping regions. Concave portions are defined at a surface of the connection lines close to the first touch coils.

12 Claims, 11 Drawing Sheets

DISPLAY PANEL AND ELECTRONIC DEVICE

BACKGROUND OF INVENTION

Field of Invention

The present application relates to the field of display, and particularly to a display panel and an electronic device.

Description of Prior Art

With development of big data and Internet, related technologies of human-computer interaction have become increasingly important. Touch technology is undoubtedly the most basic interactive technology. However, current electro magnetic resonance technology (EMR) is mostly with an add-on electromagnetic touch module, i.e., an electromagnetic touch module is added on a display panel.

In procedures of research and practice of the prior art, the inventor of the present application found that when an electromagnetic touch design is integrated into the display panel, due to sharing of an electromagnetic touch metal layer and a display wiring metal layer, the electromagnetic touch metal layer and the display wiring metal layer can interfere with each other. For example, in a mini-LED (mini light emitting diode) display, overlapping capacitance can inevitably be between connection lines and the electromagnetic touch coil of two adjacent mini-LEDs, which can cause currents flowing through the connection lines to be disturbed periodically by signals transmitted or received by the electromagnetic touch coils.

SUMMARY OF INVENTION

Embodiments of the present application provide a display panel and an electronic device, which can ease a technical problem of mutual interference between the connection lines and the electromagnetic touch coil in the display panel.

One embodiment of the present application provides a display panel, including:
- a substrate;
- a plurality of first touch coils, wherein the first touch coils are disposed on the substrate;
- a plurality of pad groups, wherein the plurality of pad groups are disposed on the substrate, and the plurality of pad groups are disposed on a side of the plurality of first touch coils facing away the substrate;
- a plurality of light-emitting units, wherein the light-emitting units are disposed on corresponding pad groups; and
- a plurality of connection lines, wherein the connection lines are disposed insulated from the first touch coils, the connection lines are connected to two of the pad groups, the connection lines and the first touch coils are disposed in different layers, the connection lines intersect with the first touch coils, intersection positions of the connection lines and the first touch coils form overlapping regions, concave portions are defined at surfaces of the connection lines close to the first touch coils, concave directions of the concave portions are from the connection lines toward directions away from the first touch coils, and the concave portions are defined corresponding to the overlapping regions, wherein each of the overlapping regions includes an outer region defined along a width direction of the first touch coils on at least one side of the concave portions; and in the width direction along the first touch coils, a relation between a width of the outer region and a wiring width of the first touch coils is:

$0 \leq D1 < D2$; and wherein D1 is the width of the outer region, and D2 is the wiring width of the first touch coils.

Optionally, in some embodiments of the present application, a cross-sectional area of the concave portions accounts for 10% to 25% of a total cross-sectional area of the overlapping regions.

Optionally, in some embodiments of the present application, the concave portions are defined at a middle of the overlapping regions along a width direction of the connection lines, and the concave portions penetrate through a surface of the plurality of connection lines to form a first opening at the surface of the plurality of connection lines.

Optionally, in some embodiments of the present application, the concave portions are defined on at least one side of the overlapping regions along a width direction of the connection lines, the concave portions penetrate through a surface of the connection lines to form a first opening at the surface of the plurality of connection lines, and the concave portions penetrate through a lateral surface of the connection lines to form a second opening at the lateral surface of the plurality of connection lines.

Optionally, in some embodiments of the present application, at least two of the concave portions are defined in the overlapping regions, one of the concave portions is disposed at a middle of the overlapping regions along a width direction of the connection lines, other one of the concave portions is defined on at least one side of the overlapping regions along the width direction of the connection lines;

the one of the concave portions defined at the middle of the overlapping regions penetrates through a surface of the plurality of connection lines to form one of first openings at the surface of the plurality of connection lines, the other one of the concave portions defined on the at least one side of the overlapping regions penetrates through the surface of the connection lines to form another one of the first openings at the surface of the connection lines, and the concave portions further penetrate through a lateral surface of the connection lines to form a second opening at the lateral surface of the connection lines.

Optionally, in some embodiments of the present application, a concave depth of the concave portions is less than or equal to a thickness of the plurality of connection lines.

Optionally, in some embodiments of the present application, the display panel includes a first metal layer, a first insulation layer, a second metal layer, a second insulation layer, and a third metal layer sequentially stacked on the substrate; the connection lines are disposed in the first metal layer or the third metal layer, and the first touch coils are disposed in the second metal layer.

Optionally, in some embodiments of the present application, a thickness of the first insulation layer is less than a thickness of the second insulation layer.

Optionally, in some embodiments of the present application, the display panel further includes second touch coils, and the second touch coils are disposed in the third metal layer.

Optionally, in some embodiments of the present application, the display panel further includes a plurality of thin film transistors, a gate electrode of the plurality of thin film transistors is disposed in the first metal layer, and a source electrode and a drain electrode of the plurality of thin film transistors are disposed in the second metal layer.

Optionally, in some embodiments of the present application, in the overlapping regions, the touch coils include a first connection portion and a second connection portion, the second connection portion is disposed corresponding to the concave portions, and an interval between the first connection portion and the connection lines is greater than an interval between the second connection portion and the connection lines.

One embodiment of the present application further provides an electronic device, including the aforesaid display panel.

A display panel and an electronic device are adopted in embodiments of the present application. The connection lines and the first touch coils are disposed in different layers. The connection lines intersect with the first touch coils. Intersection positions of the connection lines and the first touch coils form overlapping regions. Concave portions are defined at a surface of the connection lines close to the first touch coils. Concave directions of the concave portions are from the connection lines toward directions away from the first touch coils. The concave portions are defined corresponding to the overlapping regions. When the concave depth of the concave portion is less than the thickness of the connection lines, the interval between the connection lines and the first touch coils corresponding to the concave portion can be increased, which is beneficial to reduce overlapping capacitance between the connection wires and the first touch coils. When the concave depth of the concave portion is equal to the thickness of the connection lines, the overlapping area between the connection lines and the first touch coils can be decreased, which is beneficial to reduce the overlapping capacitance between the connection wires and the first touch coils. By the aforesaid configuration, the technical problem of mutual interference between the connection lines and the electromagnetic touch coil in the display panel can be eased.

DESCRIPTION OF DRAWINGS

To more clearly illustrate the technical solutions of the embodiments of the present application, the accompanying figures of the present application will be described in brief. Obviously, the accompanying figures described below are only part of the embodiments of the present application, from which figures those skilled in the art can derive further figures without making any inventive efforts.

DETAILED DESCRIPTION OF EMBODIMENTS

Figure 1:
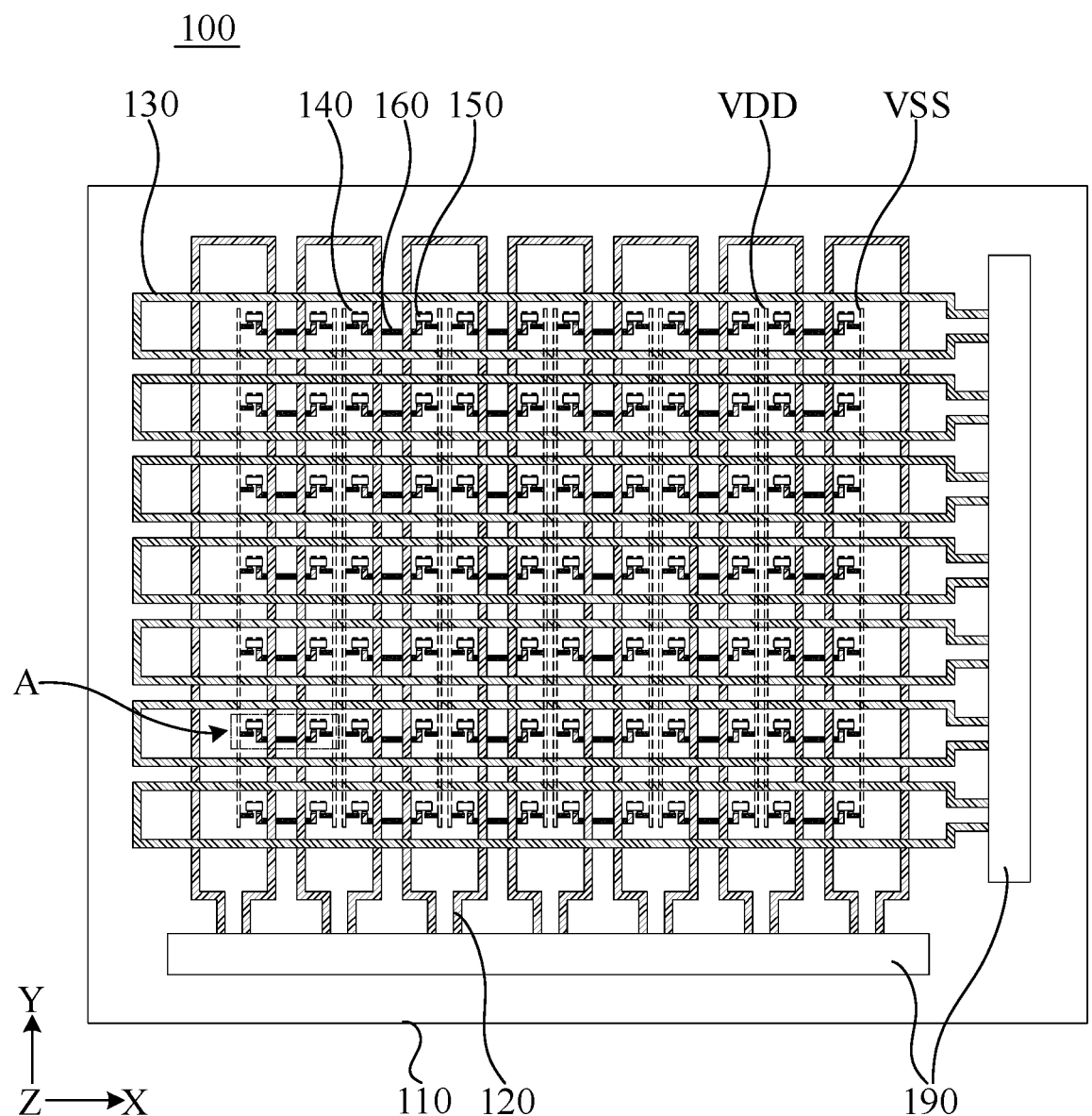
FIG. 1 is a schematic diagram of a planar structure of a display panel provided by one embodiment of the present application.

The technical solutions in the embodiments of the present application are clearly and completely described in the following with reference to the accompanying drawings in the embodiments of the present application. Obviously, the described embodiments are only part of the embodiments of the present application, but are not all embodiments of the present application. According to the embodiments of the present application, all other embodiments obtained by those skilled in the art without creative efforts are within the scope of the present application. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

The embodiments of the present application provide a display panel and an electronic device. The details are described below respectively. It should be noted that a description order of the following embodiments is not intended to limit a preferred order of the embodiments.

Figure 2:
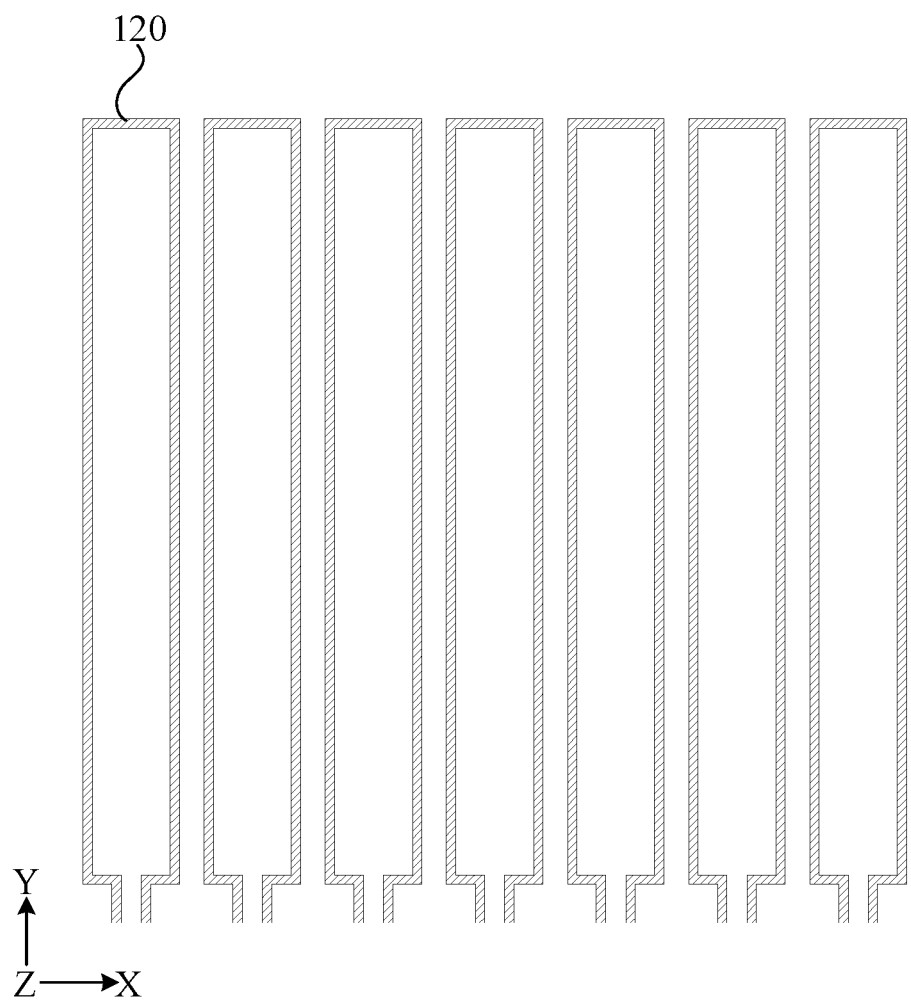
FIG. 2 is a structural schematic diagram of first touch coils provided by one embodiment of the present application.
Figure 3:
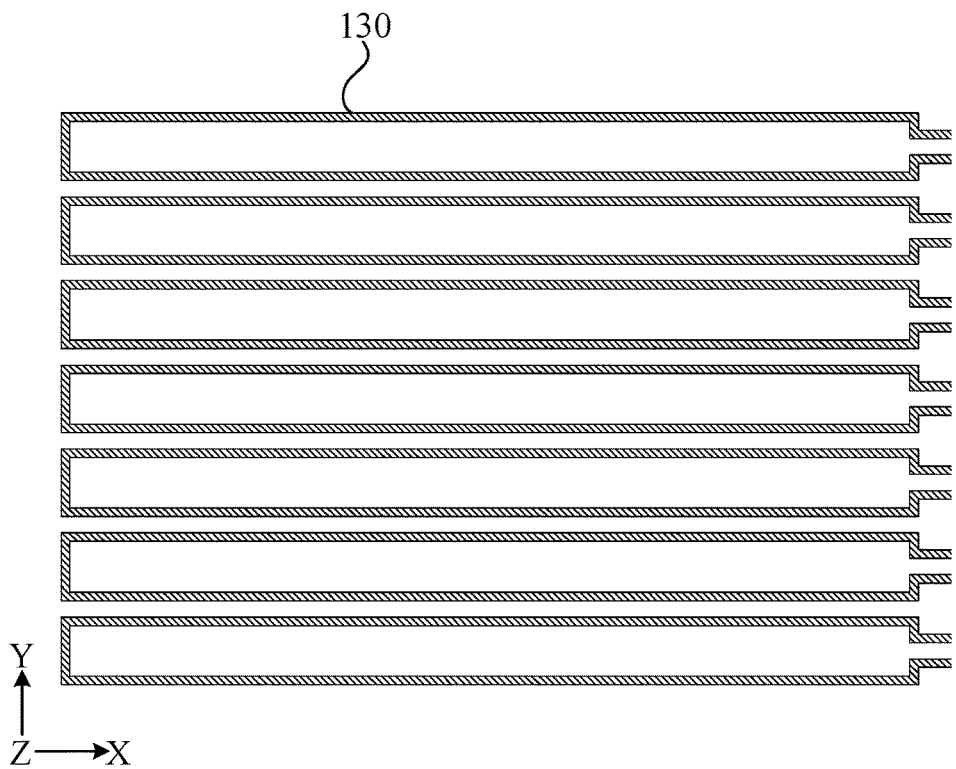
FIG. 3 is a structural schematic diagram of second touch coils provided by one embodiment of the present application.

Please refer to FIG. 1 to FIG. 3. One embodiment of the present application provides a display panel 100, including a substrate 110, a plurality of first touch coils 120, and a plurality of second touch coils 130. The first touch coils 120 and the second touch coils 130 are disposed on the substrate 110, and the first touch coils 120 and the second touch coils 130 are located in different structural layers. The first touch coils 120 and the second touch coils 130 are disposed insulated from each other. In one embodiment of the present application, the first touch coils 120 and the second touch coils 130 are electromagnetic touch coils.

The plurality of first touch coils 120 are spaced apart along a first direction X, and the first touch coils 120 are configured to sense touch signals in a second direction Y.

The plurality of second touch coils 130 are spaced apart along the second direction Y, and the second touch coils 130 are configured to sense touch signals in the first direction X. The first direction X and the second direction Y intersect with each other, and an included angle between the first direction X and the second direction Y may be, but not limited to a vertical angle.

Under this structure, by sensing the touch signals in the second direction Y through the first touch coils 120, coordinates of touch points in the second direction Y can be sensed; and by sensing the touch signals in the first direction X through the second touch coils 130, coordinates of touch points in the first direction X can be sensed. In this way, specific positions of touch points can be determined. In this embodiment, the display panel 100 further includes a control chip 190. Pins at two ends of the first touch coils 120 are connected to the control chip 190, and pins at two ends of the second touch coils 130 are connected to the control chip 190.

Specifically, as illustrated in FIG. 1, the display panel 100 further includes a plurality of pad groups 140 and a plurality of light-emitting units 150. The light-emitting units 150 can be but are not limited to mini light-emitting diodes (mini-LEDs). The pad groups 140 are disposed on the substrate 110. The light-emitting units 150 can be but is not limited to be disposed on the corresponding pad groups 140 through a welding process. The plurality of pad groups 140 are disposed in array distribution according to a manner of multiple rows timing multiplying multiple columns. The pad groups 140 are disposed on a side of the first touch coils 120 facing away the substrate 110, and the pad groups 140 are disposed insulated from the first touch coils 120. Projections of the pad groups 140 and the first touch coils 120 on the substrate 110 do not overlap with each other. In this embodiment, a row direction in which the pad groups 140 are arranged is the first direction X, and a column direction in which the pad groups 140 are arranged is the second direction Y.

Specifically, as illustrated in FIG. 1, FIG. 4, FIG. 5, and FIG. 6, the display panel 100 further includes a plurality of connection lines 160. The connection line 160 are disposed on the substrate 110. The connection lines 160 and the first touch coils 120 are disposed in different layers. The connection lines 160 are disposed insulated from the second touch coils 130. The connection lines 160 are connected to two pad groups 140, so that the two pad groups 140 are coupled in series through the connection lines 160. The connection lines 160 and the first touch coils 120 are located in different structural layers. The connection lines 160 and the first touch coils 120 are disposed in different layers, and the connection lines 160 intersect with the first touch coils 120. Intersection positions of the connection lines 160 and the first touch coils 120 form overlapping regions 170. In this embodiment, a thickness direction refers to a third direction Z, and any two of the first direction X, the second direction Y, or the third direction Z can be disposed vertically to each other.

Figure 4:
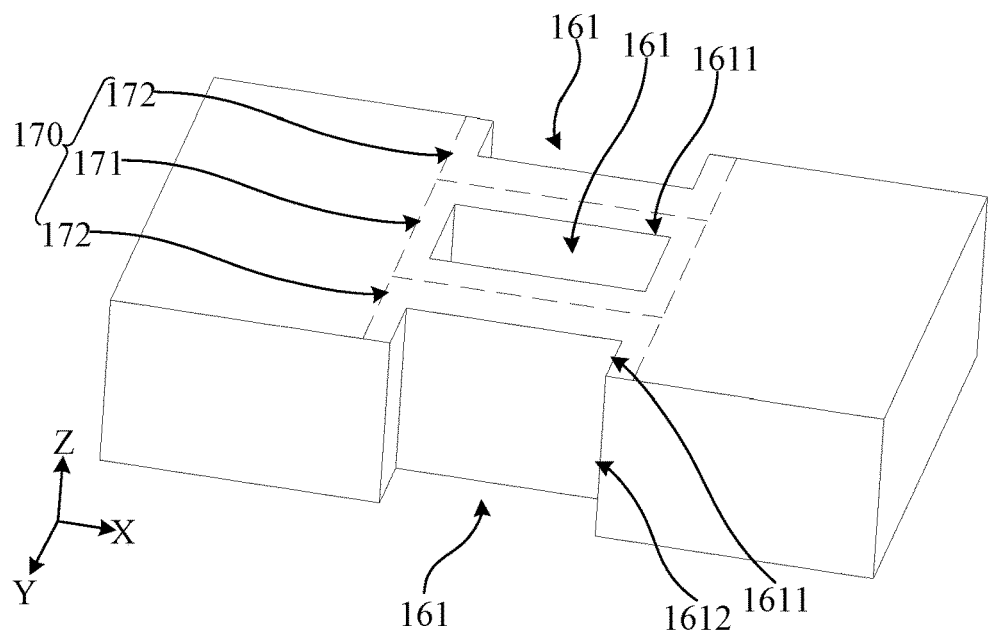
FIG. 4 is a schematic diagram of a three-dimensional structure of connection lines provided by one embodiment of the present application.
Figure 5:
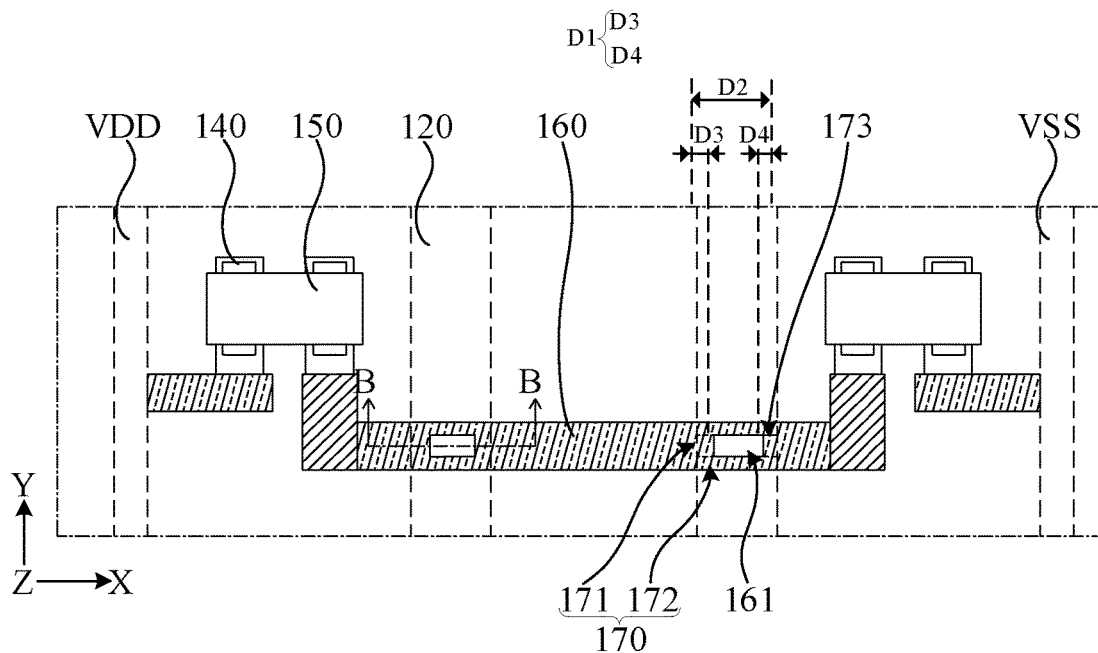
FIG. 5 is a schematic diagram of a first enlarged structure of region A in FIG. 1.
Figure 6:
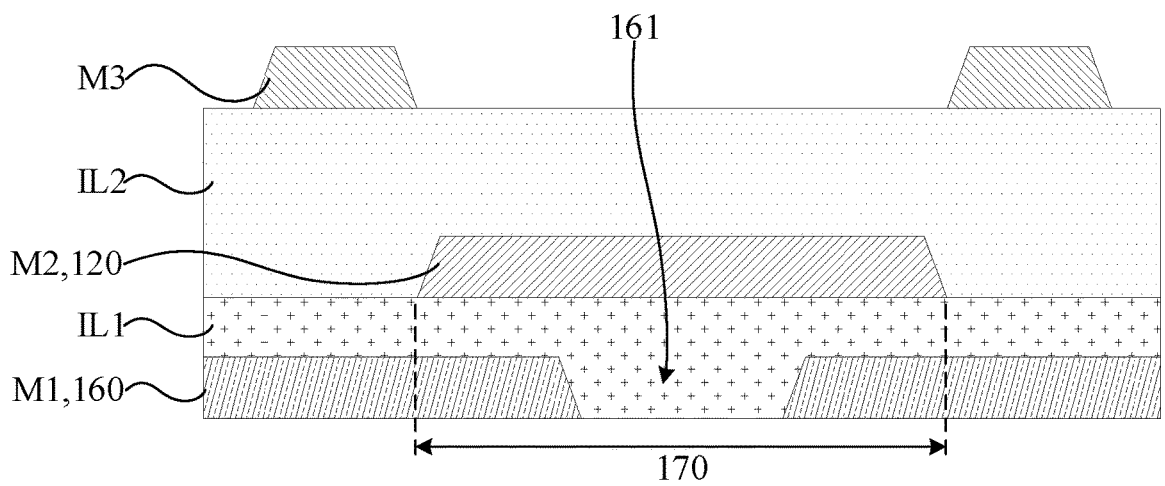
FIG. 6 is a schematic diagram of a first cross-sectional structure along direction B-B in FIG. 5.

Specifically, as illustrated in FIG. 4 to FIG. 6, concave portions 161 are defined at a surface of the connection lines 160 close to the first touch coils 120, concave directions of the concave portions 161 are from the connection lines 160 toward directions away from the first touch coils 120, and the concave portions 161 are defined corresponding to the overlapping regions 170. It should be noted that, in order to show the concave portion 161 of the connection line 160, the first touch coil 120 is omitted, and dotted lines are adopted to show the position of the first touch coil 120.

In one embodiment of the present application, the overlapping regions 170 include an outer region 173 defined along a width direction of the first touch coils 120 on at least one side of the concave portions 161; and in the width direction along the first touch coils 120, a relation between a width of the outer region 173 and a wiring width of the first touch coils 120 is:

$0 \leq D1 < D2$.

Wherein, D1 is the width of the outer region 173, and D2 is the wiring width of the first touch coils 120. Under this configuration, when the width D1 of all the outer regions 173 is 0, in the width direction of the first touch coils 120, no outer region 173 is defined in the overlapping regions 170.

In one embodiment of the present application, along the width direction of the first touch coils 120, two opposite sides of the concave portion 161 are provided with the outer regions 173, and the width D1 of all the outer regions 173 is equal to the width D3 of one of the outer regions 173 plus the width D4 of another one of the outer regions 173. Of course, according to selections of actual situations and configurations of specific requirements, along the width direction of the first touch coils 120, the outer region 173 is only defined on one side of the concave portion 161.

Figure 7:
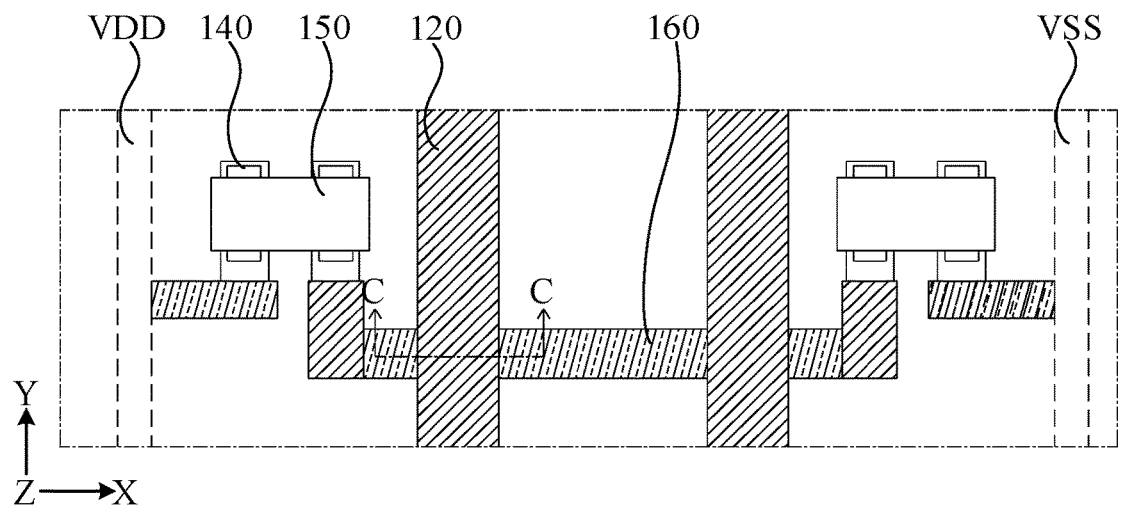
FIG. 7 is a schematic diagram of a local enlarged structure of a display panel provided by a comparison embodiment.
Figure 8:
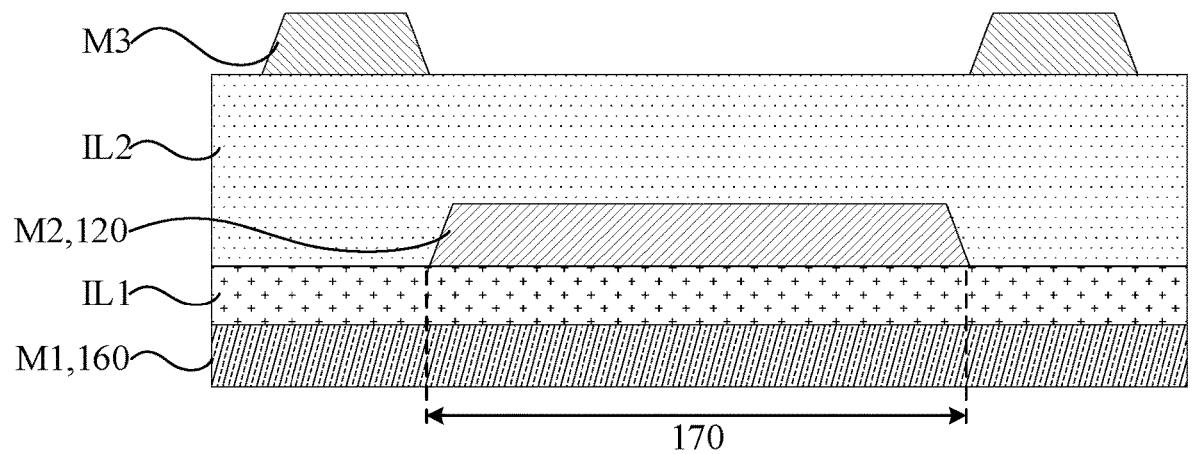
FIG. 8 is a schematic diagram of a cross-sectional structure along direction C-C in FIG. 7.

FIG. 7 is a schematic diagram of a local enlarged structure of the display panel 100 provided by a comparison embodiment of the present application. FIG. 8 is a schematic diagram of a cross-sectional structure along the direction C-C in FIG. 7. The difference between the display panel 100 illustrated in FIG. 7 and FIG. 8 and the display panel 100 of the embodiments of the present application is mainly in that: the connection lines 160 of the embodiments of the present application is provided with the concave portion 161 in the overlapping region 170. The connection line 160 and the first touch coil 120 have overlapping capacitance in the overlapping region 170. In addition to dielectric constants of insulating media, the main factors that determine amount of a capacitor is overlapping area and distance. When the concave depth of the concave portion 161 is less than the thickness of the connection lines 160, i.e., when the concave portion 161 is a groove not penetrating through the connection line 160, the interval between the connection line 160 and the first touch coil 120 corresponding to the concave portion 161 can be increased, which is beneficial to reduce the overlapping capacitance between the connection wire 160 and the first touch coil 120. When the concave depth of the concave portion 161 is equal to the thickness of the connection lines 160, i.e., when the concave portion 161 is a through hole penetrating through the connection line 160, the overlapping area between the connection line 160 and the first touch coil 120 can be decreased, which is beneficial to reduce the overlapping capacitance between the connection wire 160 and the first touch coil 120. By the aforesaid configuration, the technical problem of mutual interference between the connection lines 160 and the electromagnetic touch coil in the display panel 100 can be eased, the poor risk of the electromagnetic touch design integrated into the display panel 100 can be decreased, and display stability of the display panel 100 can be effectively improved.

Specifically, a cross-sectional area of the concave portions 161 accounts for 10% to 25% of a total cross-sectional area of the overlapping regions 170. Under the range proportion, not only transmission ability of signals of the connection lines 160 can be ensured, but also the problem of mutual interference between the connection lines 160 and the electromagnetic touch coil in the display panel 100 can be effectively eased.

Specifically, as illustrated in FIG. 1 and FIG. 5, the display panel 100 further includes a plurality of first power supply branch lines VDD and a plurality of second power supply branch lines VSS. The first touch coils 120 and the second touch coils 130 are both disposed insulated from the first power supply branch lines VDD. The first touch coils 120 and the second touch coils 130 are both disposed insulated from the second power supply branch lines VSS. Regarding one of the two pad groups 140 connected to one connection line 140, one of the pad groups 140 is connected to the first power supply branch line VDD, and another one of the pad groups 140 is connected to the second power supply branch line VSS.

Specifically, as illustrated in FIG. 4 to FIG. 6, the concave portions 161 are defined at a middle of the overlapping regions 170 along a width direction of the connection lines 160, and the concave portions 161 penetrate through a surface of the connection lines 160 to form a first opening 1611 at the surface of the connection lines 160. Wherein, the surface of the connection lines 160 at least includes a surface of a side of the connection line 160 close to the first touch coils 120. When the concave portion 161 is a groove, the surface of the connection line 160 is only a surface of a side of the connection line 160 close to the first touch coil 120, and the first opening 1611 of the concave portion 161 is defined at the surface of the side of the connection line 160 close to the first touch coil 120. When the concave portion 161 is a through hole, the surface of the connection line 160 further includes a surface of a side of the connection line 160 away from the first touch coil 120, and a first opening 1611 of the concave portion 161 is also defined at the surface of the side of the connection line 160 away from the first touch coil 120.

Specifically, as illustrated in FIG. 4 to FIG. 6, the overlapping regions 170 include a first region 171 and second regions 172. The second regions 172 are defined on two opposite sides of the first region 171 along the width direction of the connection line 160, i.e., the first region 171 is located at a middle section of the connection lines 160, and the second regions are located on the two sides of the connection lines 160. In one embodiment illustrated in FIG. 5 and FIG. 6, the first region 171 is provided with the concave portion 161, i.e., the concave portion 161 is provided at the middle section of the connection line 160. Under this structure, the technical problem of mutual interference between the connection lines 160 and the electromagnetic touch coil in the display panel 100 can be eased. In one embodiment of the present application, the width direction of the connection lines 160 is the second direction Y, the meaning of the width direction of the connection line 160 will not be repeated in the following again.

Figure 9:
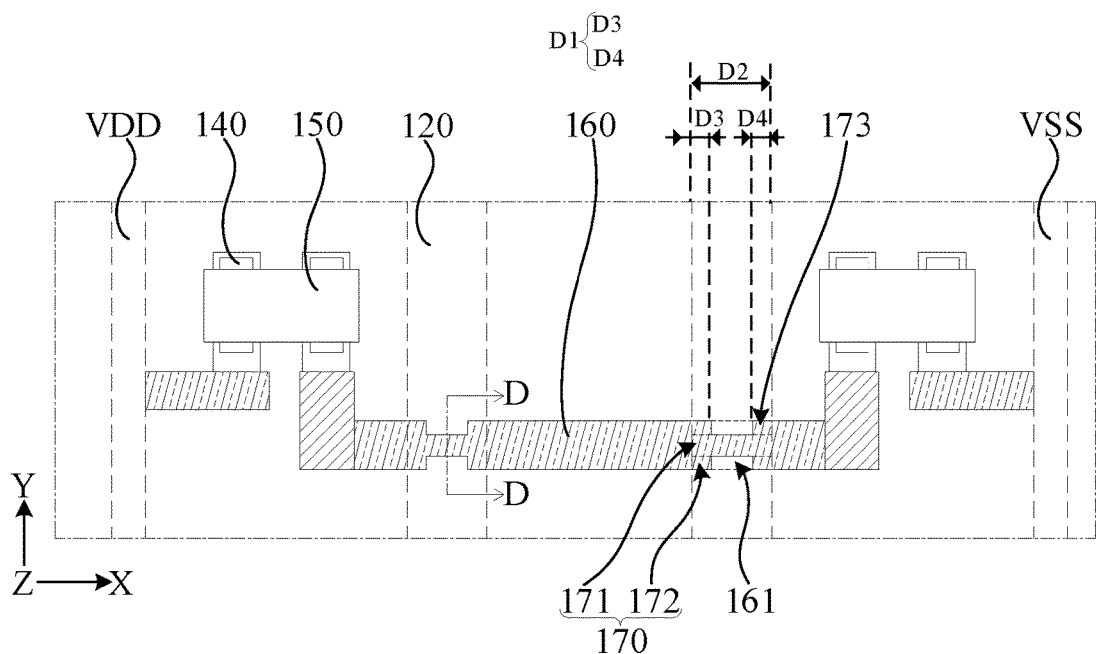
FIG. 9 is a schematic diagram of a second enlarged structure of the region A in FIG. 1.
Figure 10:
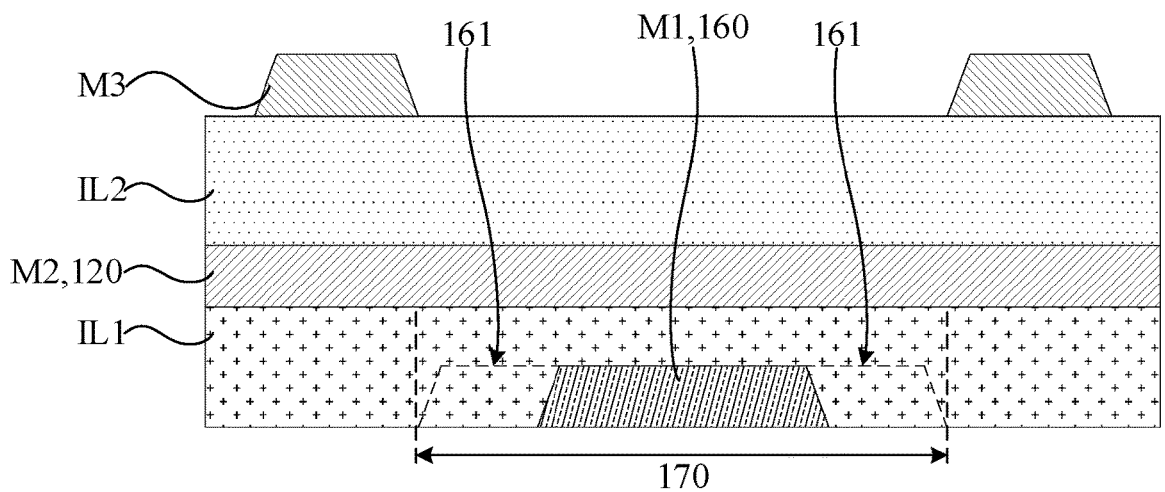
FIG. 10 is a schematic diagram of a first cross-sectional structure along direction D-D in FIG. 9.

Specifically, as illustrated in FIG. 4, FIG. 9, and FIG. 10, the concave portions 161 are defined on at least one side of the overlapping regions 170 along the width direction of the connection lines 160, the concave portions 161 penetrate through a surface of the connection lines 160 to form the first opening 1611 at the surface of the connection lines 160, and the concave portions 161 further penetrate through a lateral surface of the connection lines 160 to form a second opening 1612 at the lateral surface of the connection lines 160. Wherein, the surface of the connection lines 160 at least includes a surface of a side of the connection line 160 close to the first touch coils 120. When the concave portion 161 is a groove, the surface of the connection line 160 is only a surface of a side of the connection line 160 close to the first touch coil 120, and the first opening 1611 of the concave portion 161 is defined at the surface of the side of the connection line 160 close to the first touch coil 120. When the concave portion 161 is a through hole, the surface of the connection line 160 further includes a surface of a side of the connection line 160 away from the first touch coil 120, and a first opening 1611 of the concave portion 161 is also defined at the surface of the side of the connection line 160 away from the first touch coil 120.

Specifically, as illustrated in FIG. 4, FIG. 9, and FIG. 10, the overlapping regions 170 include a first region 171 and second regions 172. The second regions 172 are defined on two opposite sides of the first region 171 along the width direction of the connection line 160, i.e., the first region 171 is located at a middle section of the connection lines 160, and the second regions are located on the two sides of the connection lines 160. In one embodiment illustrated in FIG. 9 and FIG. 10, with reference to FIG. 4, the second region 172 is provided with the concave portions 161, the concave portions 161 include the first opening 1611 and the second opening 1612, The first opening 1611 is defined at a surface of the connection line 160 close to the first touch coils 120, and the second opening 1612 is disposed at a lateral surface of the line connections 160, i.e., the concave portion 161 is defined on at least one side of the connection line 160 along the second direction Y.

It can be understood that, according to selections of actual situations and configuration of specific requirements, as illustrated in FIG. 4, both the first region 171 and the second region 172 are provided with the concave portions 161. Specifically, at least two concave portions 161 are defined in the overlapping region 170, one of the concave portions 161 is defined at a middle of the overlapping regions 170 along the width direction of the connection lines 160, and another one of the concave portions 161 is defined on at least one side of the overlapping regions 170 along the width direction of the connection lines 160. The concave portion 161 defined at the middle of the overlapping regions 170 penetrates through a surface of the connection lines 160 to form the first opening 1611 at the surface of the connection lines 160. The concave portion 161 defined on the at least one side of the overlapping regions 170 penetrates through the surface of the connection lines 160 to form the first opening 1611 at the surface of the connection lines 160. The concave portions 161 further penetrate through the lateral surface of the connection lines 160 to form the second opening 1612 at the lateral surface of the connection lines 160.

Specifically, in one embodiment of the present application, the display panel 100 includes a first metal layer M1, a first insulation layer IL1, a second metal layer M2, a second insulation layer IL2, and a third metal layer M3 sequentially stacked on the substrate 110. The first touch coils 120 are disposed in the second metal layer M2. Wherein, in the embodiments illustrated in FIG. 5, FIG. 6, FIG. 9, or FIG. 10, the connection line 160 is disposed in the first metal layer M1. Of course, according to selections of actual situations and configuration of specific requirements, the connection lines 160 can be disposed in other structural layers. For example, as illustrated in FIG. 11 to FIG. 14, the connection lines 160 can also be disposed in the third metal layer M3, which is not limited herein. In the embodiments of the present application, the second touch coils 130 are disposed in the third metal layer M3.

Figure 11:
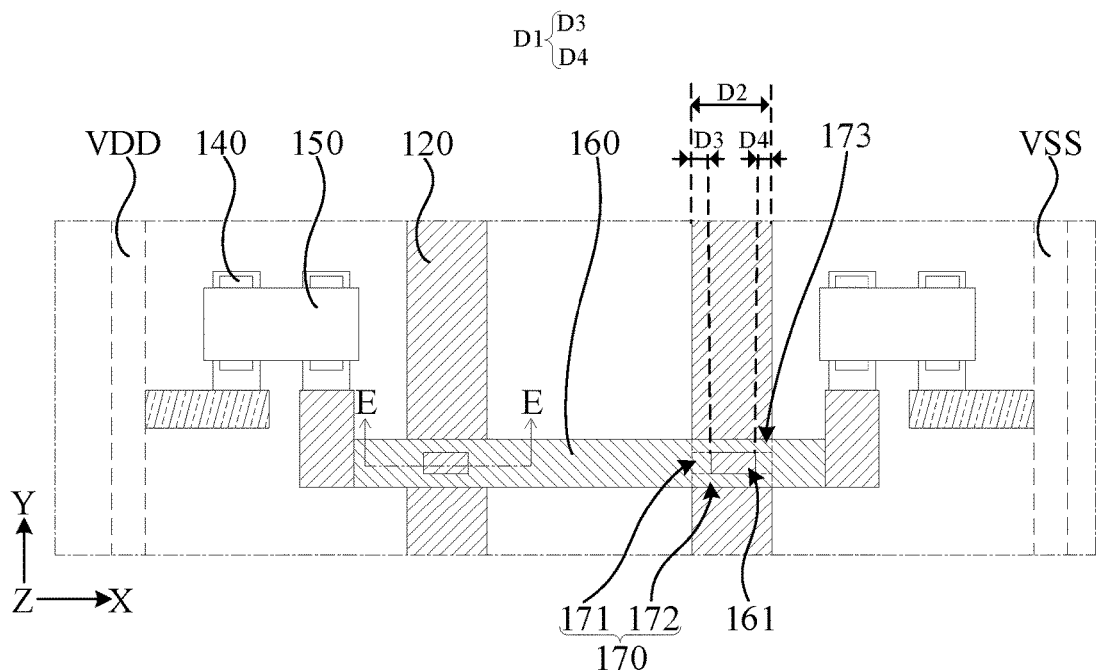
FIG. 11 is a schematic diagram of a third enlarged structure of the region A in FIG. 1.
Figure 12:
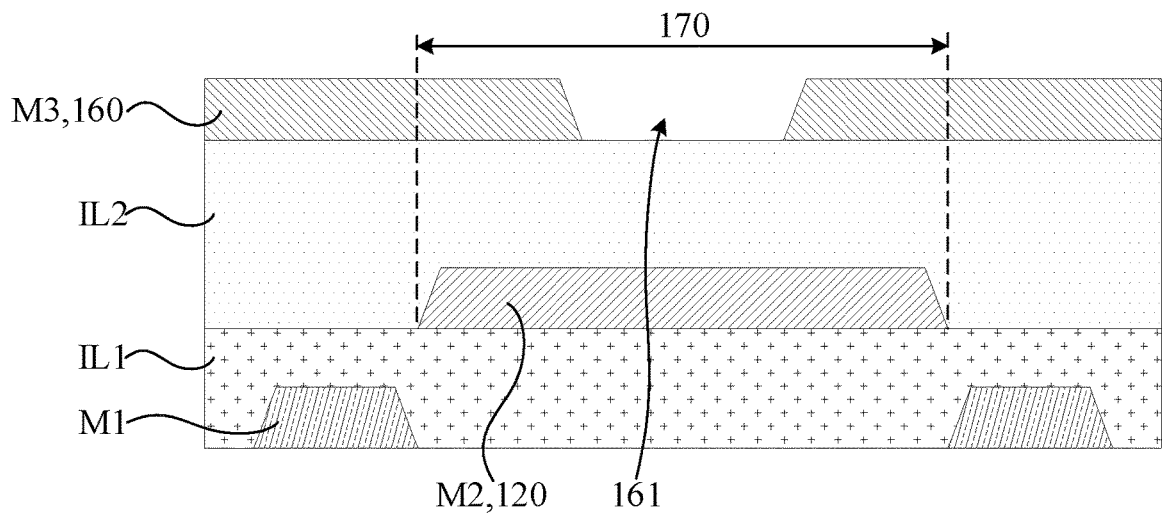
FIG. 12 is a schematic diagram of a first cross-sectional structure along direction E-E in FIG. 11.

The difference between the embodiment corresponding to FIG. 11 and FIG. 12 and the embodiment corresponding to FIG. 5 and FIG. 6 is only in that: the connection line 160 is disposed in the first metal layer M1 in the embodiment corresponding to FIG. 5 and FIG. 6, and the connection line 160 is disposed in the third metal layer M3 in the embodiment corresponding to FIG. 11 and FIG. 12.

Figure 13:
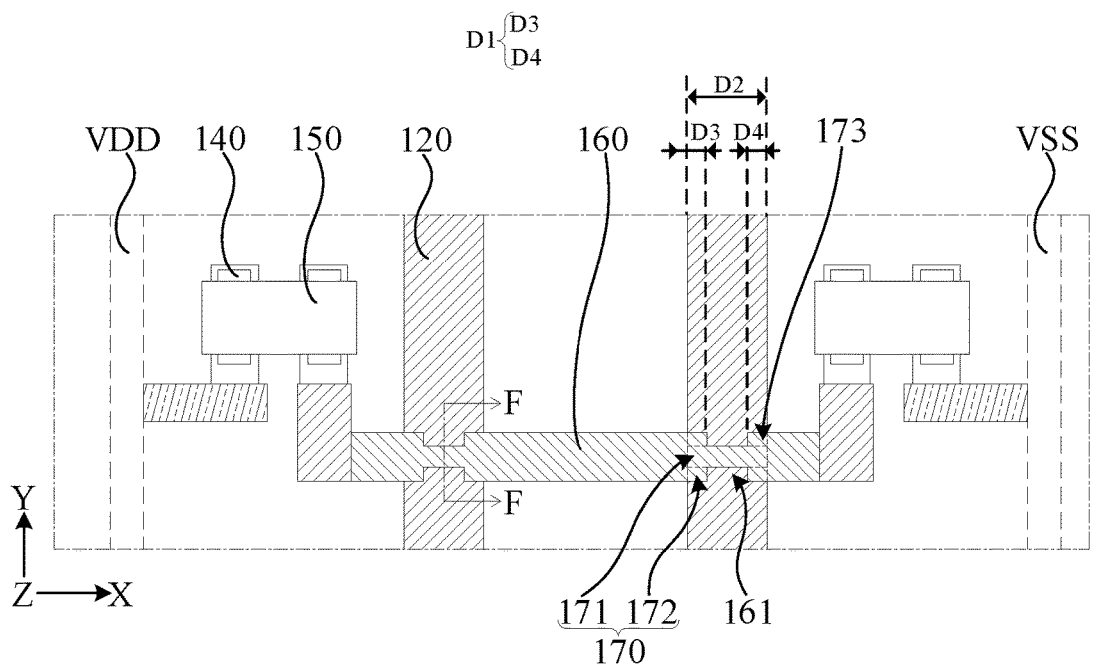
FIG. 13 is a schematic diagram of a fourth enlarged structure of the region A in FIG. 1.
Figure 14:
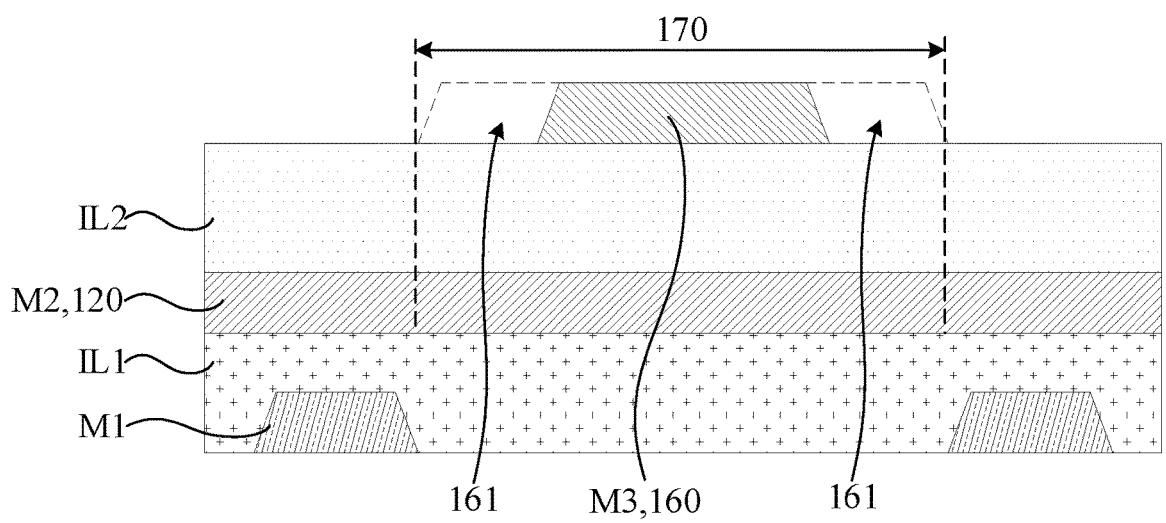
FIG. 14 is a schematic diagram of a first cross-sectional structure along direction F-F in FIG. 13.

The difference between the embodiment corresponding to FIG. 13 and FIG. 14 and the embodiment corresponding to FIG. 9 and FIG. 10 is only in that: the connection line 160 is disposed in the first metal layer M1 in the embodiment corresponding to FIG. 9 and FIG. 10, and the connection line 160 is disposed in the third metal layer M3 in the embodiment corresponding to FIG. 13 and FIG. 14.

Specifically, the thickness of the first insulation layer IL1 is less than the thickness of the second insulation layer IL2, which is beneficial to further reduce the overlapping capacitance between the connection line 160 and the first touch coil 120. Under this structure, when the thickness of the first insulation layer IL1 is less than the thickness of the second insulation layer IL2, by disposing the connection line 160 disposed in the third metal layer M3, the interval between the connection line 160 and the first touch coil 120 can be further increased, which is beneficial to reduce the overlapping capacitance between the connection line 160 and the first touch coil 120. For example, the overlapping capacitance of the embodiment corresponding to FIG. 11 and FIG. 12 is less than the overlapping capacitance of the embodiment corresponding to FIG. 5 and FIG. 6, and the overlapping capacitance of the embodiment corresponding to FIG. 13 and FIG. 14 is less than the overlapping capacitance of the embodiment corresponding to FIG. 9 and FIG. 10.

Specifically, the thickness of the first insulation layer IL1 ranges from 1000 angstroms to 2000 angstroms, and the thickness of the second insulation layer IL2 ranges from 10000 angstroms to 20000 angstroms. Specifically, the thickness of the first insulation layer IL1 can be 1000 angstroms, 1100 angstroms, 1200 angstroms, 1300 angstroms, 1400 angstroms, 1500 angstroms, 1600 angstroms, 1700 angstroms, 1800 angstroms, 1900 angstroms, or 2000 angstroms. The thickness of the second insulation layer IL2 can be 10000 angstroms, 11000 angstroms, 12000 angstroms, 13000 angstroms, 14000 angstroms, 15000 angstroms, 16000 angstroms, 17000 angstroms, 18000 angstroms, 19000 angstroms, or 20000 angstroms. Of course, according to selections of actual situations and configuration of specific requirements, the thicknesses of the first insulation layer IL2 and the second insulation layer IL2 can be adjusted appropriately, which are not limited herein.

Specifically, a dielectric constant of the first insulation layer IL1 is less than an dielectric constant of the second insulation layer IL2. Under this structure, by the aforesaid configuration, and by disposing the connection line 160 in the third metal layer M3, the overlapping capacitance between the connection wire 160 and the first touch coil 120 is beneficial to be reduced.

Specifically, in one embodiment of the present application, the concave depth of the concave portion 161 is equal to the thickness of the connection line 160, i.e., the concave portion 161 is defined to penetrate through the connection line 160. Of course, according to selections of actual situations and configuration of specific requirements, the concave depth of the concave portion 161 can also be less than the thickness of the connection line 160, i.e., the concave portion 161 is a groove.

Figure 15:
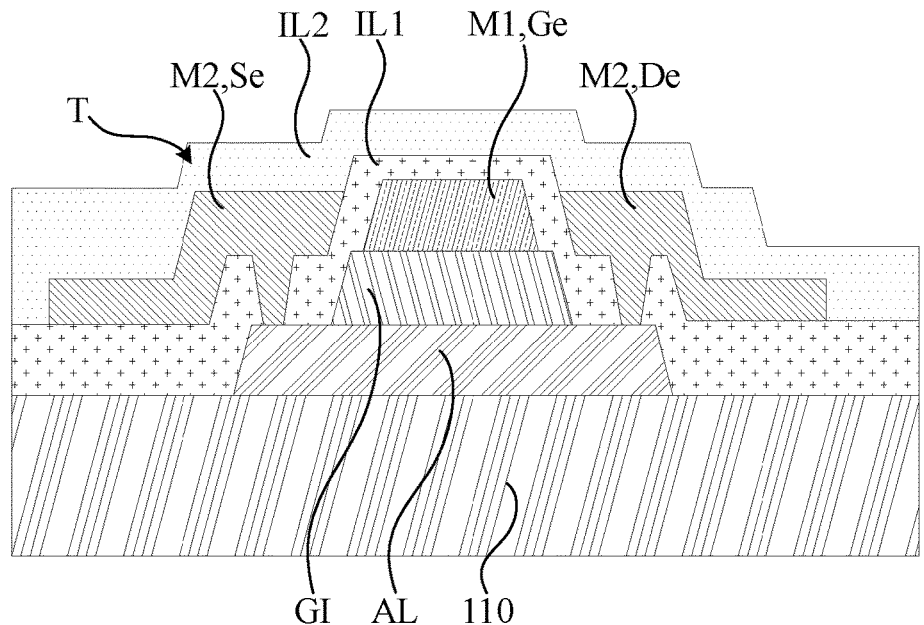
FIG. 15 is a schematic diagram of a cross-sectional structure of a transistor provided by one embodiment of the present application.

Specifically, as illustrated in FIG. 1 and FIG. 15, the display panel 100 further includes a plurality of thin film transistors T, and the first power supply branch line VDD is connected to the pad group 140 through corresponding thin film transistor T. The display panel 100 further includes a gate insulation layer GI. The thin film transistor layer T includes an active layer AL, a gate electrode Ge, a source electrode Se, and a drain electrode De. The active layer AL is disposed on the substrate 110. The gate electrode Ge is disposed on the active layer AL. The first insulation layer IL1 covers the gate electrode Ge, the active layer AL, and the substrate 110. The source electrode Se and the drain electrode De are disposed on the first insulation layer IL1. Furthermore, the source electrode Se and the drain electrode De respectively contact to the active layer AL. Wherein, the gate electrode Ge is disposed in the first metal layer M1, and the source electrode Se and the drain electrode De are disposed in the second metal layer M2.

Specifically, as illustrated in FIG. 16 to FIG. 19, in the overlapping regions 170, the touch coils 120 include a first connection portion 121 and a second connection portion 122, the second connection portion 122 is disposed corresponding to the concave portions 161, and an interval between the first connection portion 121 and the connection lines 160 is greater than an interval between the second connection portion 122 and the connection lines 160. Under this structure, by increasing the distance between the first connection portion 121 and the connection line 160, the overlapping capacitance between the connection line 160 and the first touch coil 120 is beneficial to be reduced.

Figure 16:
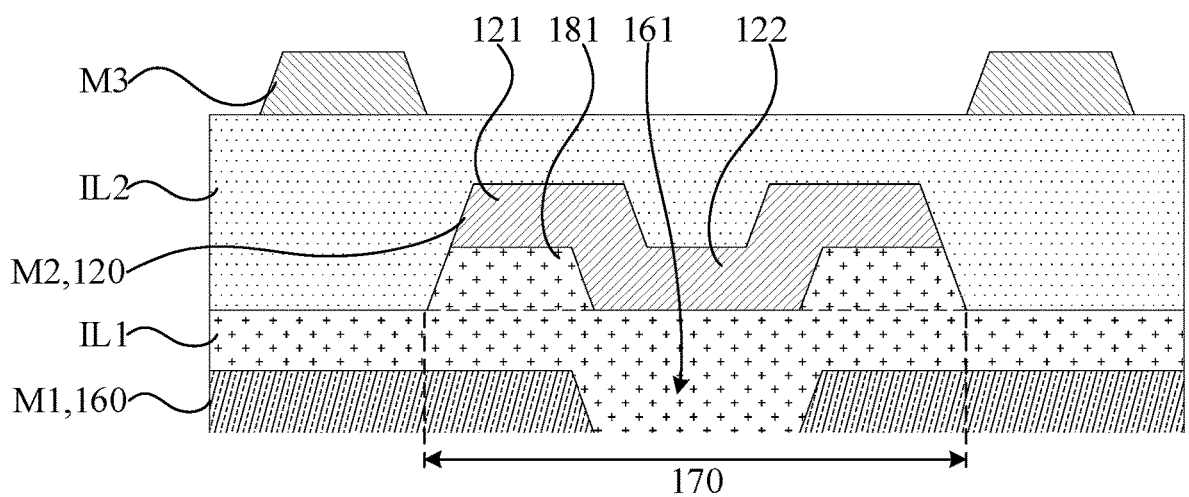
FIG. 16 is a schematic diagram of a second cross-sectional structure along direction B-B in FIG. 5.
Figure 17:
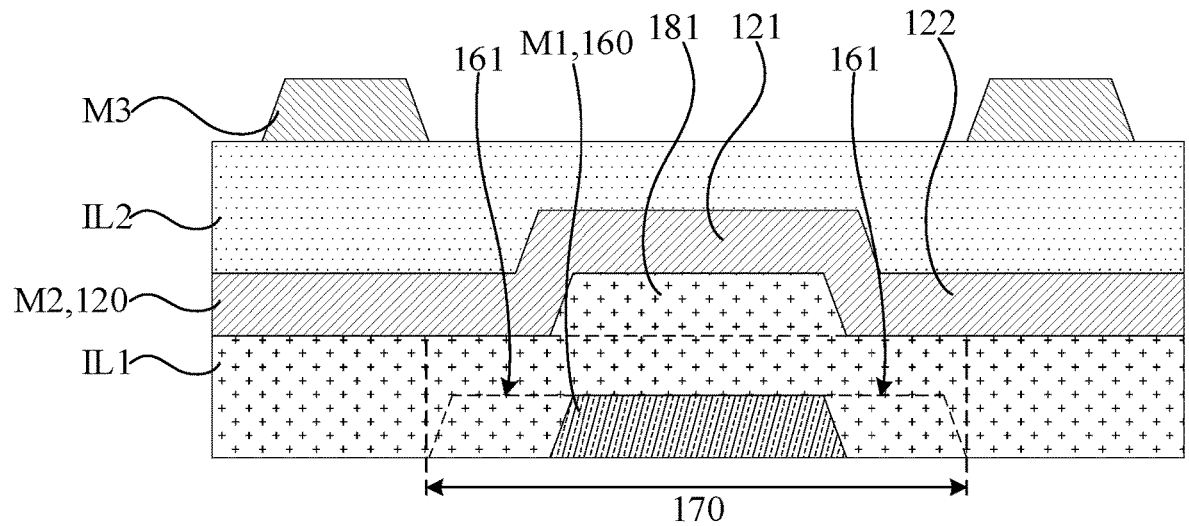
FIG. 17 is a schematic diagram of a second cross-sectional structure along direction D-D in FIG. 9.

Specifically, as illustrated in FIG. 16 and FIG. 17, a raised portion 181 is protruded from a surface of the first insulation layer IL1 close to the first touch coil 120. The raised portion 181 is disposed corresponding to the first connection portion 121. The first connection portion 121 covers the raised portion 181, thereby increasing the interval between the first connection portion 121 and the connection line 160.

Figure 18:
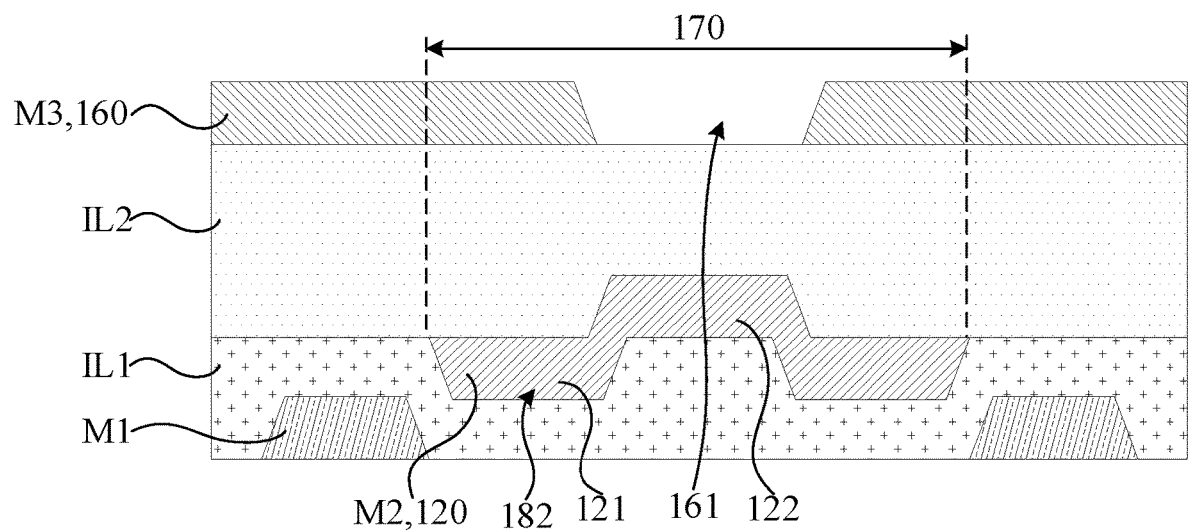
FIG. 18 is a schematic diagram of a second cross-sectional structure along direction E-E in FIG. 11.
Figure 19:
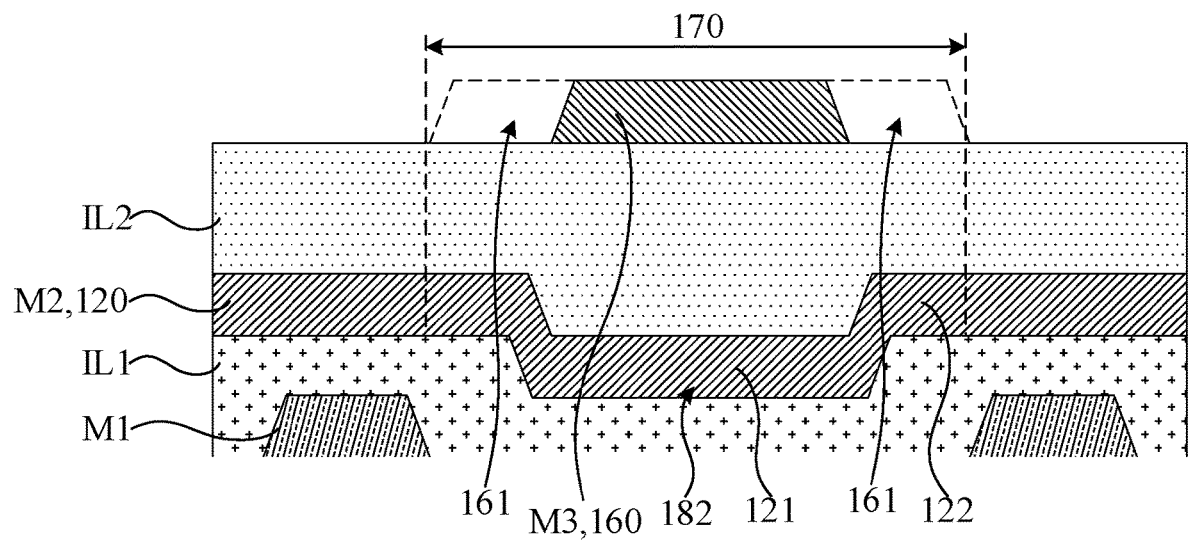
FIG. 19 is a schematic diagram of a second cross-sectional structure along direction F-F in FIG. 13.

Specifically, as illustrated in FIG. 18 and FIG. 19, a groove 182 is defined at a surface of the first insulation layer IL1 close to the first touch coil 120, the groove 182 is disposed corresponding to the first connection portion 121, and the first connection portion 121 is disposed in the groove 182, thereby increasing the interval between the first connection portion 121 and connection line 160.

Figure 20:
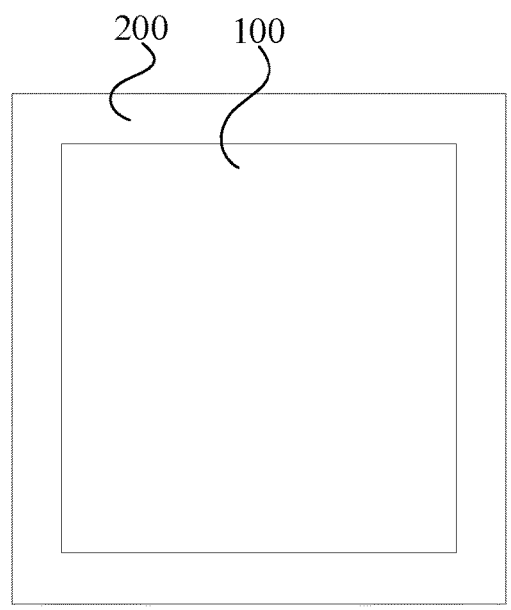
FIG. 20 is a structural schematic diagram of an electronic device provided by one embodiment of the present application.

Please refer to FIG. 20, one embodiment of the present application further provides an electronic device, including the aforesaid display panel 100. The electronic device can be a mobile terminal, e.g., an in-vehicle monitor, a smart phone, a tablet computer, a notebook computer, etc. The electronic device can also be a wearable terminal, e.g., a smart watch, a smart bracelet, smart glass, an augmented reality device, etc. The electronic device can also be a fixed terminal, e.g., a desktop computer, a television, etc. In this embodiment, the electronic device further includes a terminal body 200. The terminal body 200 is a housing. The display panel 100 is fixed on the housing.

The above describes the display panel and the electronic device provided by the embodiments of the present application in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:
1. A display panel, comprising:
    a substrate;

a plurality of first touch coils, wherein the plurality of first touch coils are disposed on the substrate;

a plurality of pad groups, wherein the plurality of pad groups are disposed on the substrate, and the plurality of pad groups are disposed on a side of the plurality of first touch coils facing away the substrate;

a plurality of light-emitting units, wherein the plurality of light-emitting units are disposed on corresponding ones of the plurality of pad groups; and a plurality of connection lines, wherein the plurality of connection lines are disposed insulated from the plurality of first touch coils, the plurality of connection lines are connected to two of the plurality of pad groups, the plurality of connection lines and the plurality of first touch coils are disposed in different layers, the plurality of connection lines intersect with the plurality of first touch coils, intersection positions of the plurality of connection lines and the plurality of first touch coils form overlapping regions, concave portions are defined at surfaces of the plurality of connection lines close to the plurality of first touch coils, concave directions of the concave portions are from the plurality of connection lines toward directions away from the plurality of first touch coils, and the concave portions are defined corresponding to the overlapping regions, wherein each of the overlapping regions comprises an outer region defined along a width direction of the plurality of first touch coils on at least one side of the concave portions; and in the width direction along the plurality of first touch coils, a relation between a width of the outer region and a wiring width of the plurality of first touch coils is:

$0 \leq D1 < D2$; and wherein D1 is the width of the outer region, and D2 is the wiring width of the plurality of first touch coils.

2. The display panel as claimed in claim 1, wherein a cross-sectional area of the concave portions accounts for 10% to 25% of a total cross-sectional area of the overlapping regions.

3. The display panel as claimed in claim 1, wherein the concave portions are defined at a middle of the overlapping regions along a width direction of the plurality of connection lines, and the concave portions penetrate through a surface of the plurality of connection lines to form a first opening at the surface of the plurality of connection lines.

4. The display panel as claimed in claim 1, wherein the concave portions are defined on at least one side of the overlapping regions along a width direction of the plurality of connection lines, the concave portions penetrate through a surface of the plurality of connection lines to form a first opening at the surface of the plurality of connection lines, and the concave portions penetrate through a lateral surface of the plurality of connection lines to form a second opening at the lateral surface of the plurality of connection lines.

5. The display panel as claimed in claim 1, wherein at least two of the concave portions are defined in the overlapping regions, one of the concave portions is disposed at a middle of the overlapping regions along a width direction of the plurality of connection lines, other one of the concave portions is defined on at least one side of the overlapping regions along the width direction of the plurality of connection lines;

the one of the concave portions defined at the middle of the overlapping regions penetrates through a surface of the plurality of connection lines to form one of first openings at the surface of the plurality of connection lines; and the other one of the concave portions defined on the at least one side of the overlapping regions penetrates through the surface of the plurality of connection lines to form another one of the first openings at the surface of the plurality of connection lines, the concave portions penetrate through a lateral surface of the plurality of connection lines to form a second opening at the lateral surface of the plurality of connection lines.

6. The display panel as claimed in claim 1, wherein a concave depth of the concave portions is less than or equal to a thickness of the plurality of connection lines.

7. The display panel as claimed in claim 1, wherein the display panel comprises a first metal layer, a first insulation layer, a second metal layer, a second insulation layer, and a third metal layer sequentially stacked on the substrate; the plurality of connection lines are disposed in the first metal layer or the third metal layer, and the plurality of first touch coils are disposed in the second metal layer.

8. The display panel as claimed in claim 7, wherein a thickness of the first insulation layer is less than a thickness of the second insulation layer.

9. The display panel as claimed in claim 7, wherein the display panel comprises second touch coils, and the second touch coils are disposed in the third metal layer.

10. The display panel as claimed in claim 7, wherein the display panel comprises a plurality of thin film transistors, a gate electrode of the plurality of thin film transistors is disposed in the first metal layer, and a source electrode and a drain electrode of the plurality of thin film transistors are disposed in the second metal layer.

11. The display panel as claimed in claim 1, wherein in the overlapping regions, the plurality of first touch coils comprise a first connection portion and a second connection portion, the second connection portion is disposed corresponding to the concave portions, and an interval between the first connection portion and the plurality of connection lines is greater than an interval between the second connection portion and the plurality of connection lines.

12. An electronic device, comprising the display panel as claimed in claim 1.

* * * * *